April 12, 1966 C. N. SMITH 3,245,412

FILE CONSTRUCTION

Filed April 1, 1964

2 Sheets-Sheet 1

INVENTOR.
Charles Norris Smith
BY
Frease, Bishop, Johns & Schick
ATTORNEYS

April 12, 1966 C. N. SMITH 3,245,412

FILE CONSTRUCTION

Filed April 1, 1964 2 Sheets-Sheet 2

INVENTOR.

Charles Norris Smith

BY

Frease, Bishop, Johns & Schick

ATTORNEYS 3,245,412
Patented Apr. 12, 1966

3,245,412

FILE CONSTRUCTION

Charles Norris Smith, North Canton, Ohio, assignor to Diebold, Incorporated, Canton, Ohio, a corporation of Ohio Filed Apr. 1, 1964, Ser. No. 356,604
7 Claims. (Cl. 129—16)

Figure 1:
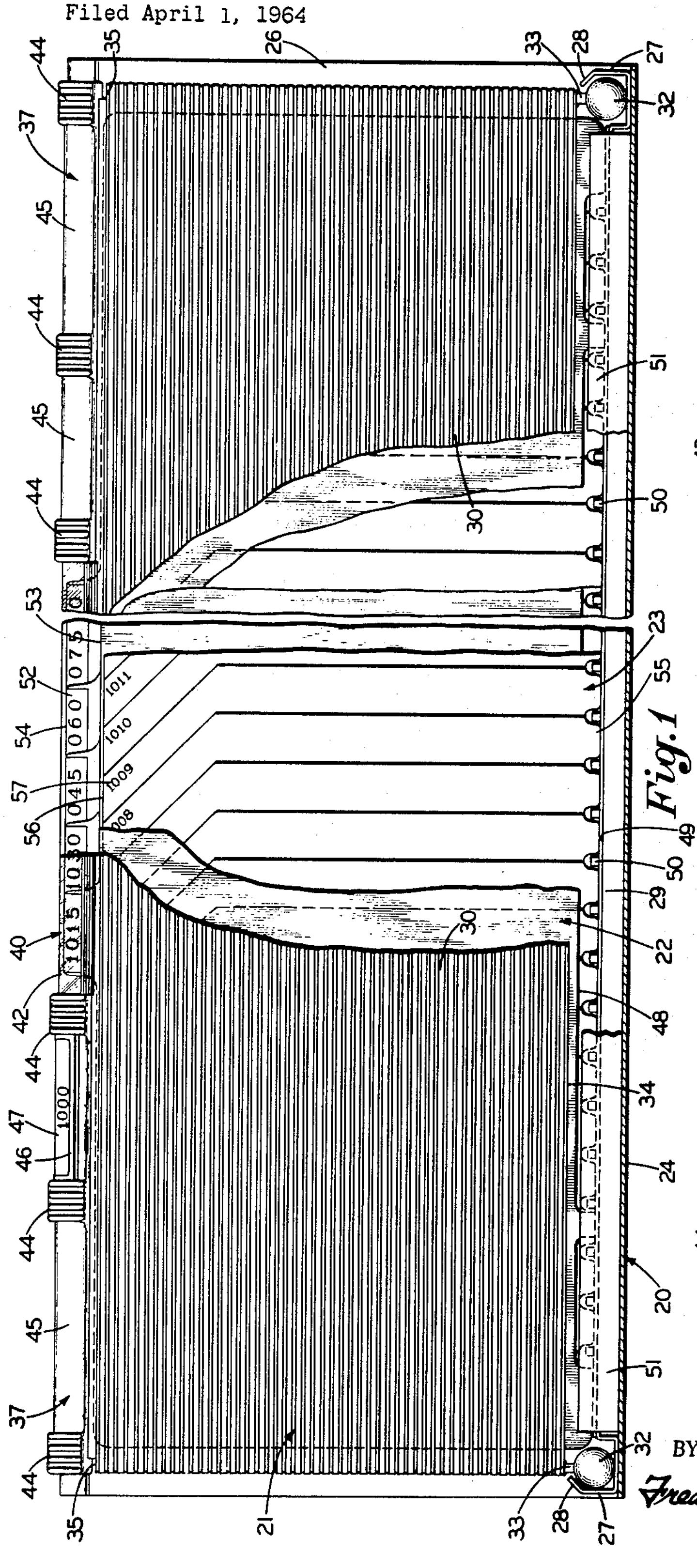

My invention relates to improvements in file constructions, and more specifically to files of the visible record type. Even more specifically, my invention relates to improvements in the construction of the main separators and the intermediate dividers of visible record files, and the particular relationship between these separators and dividers.

In visible record files, it is usual practice to provide some form of main indexing on the face of the main separators to indicate the particular series of intermediate dividers and record cards which are retained between these main separators, and this has usually been done by placing the main indexing at the upper edge, and frequently adjacent one of the side edges, of the main separators. Furthermore, it has been frequent practice in these prior constructions to also place intermediate indexing at the upper edge of the main separator relating to the particular indexing on the individual dividers and record cards behind that particular separator, sometimes appropriately aligning this intermediate indexing with the particular upstanding tab of the intermediate divider to which this main separator intermediate indexing relates.

Thus, with the prior visible record files formed in this manner, it is possible for a filing clerk viewing any particular main separator, to choose any particular intermediate indexing category behind that particular main separator and, with the fingers of one hand positioned over the main separator upper edge at the appropriate intermediate indexing on this main separator, engage the tab of the desired intermediate divider. In this way, the file can be opened directly at the particular intermediate divider having the particular desired intermediately indexed record cards therebehind.

One of the major difficulties with these prior forms of visible record files is that it is necessary in setting up such a file, or in making alterations in indexing on such a file, to provide double intermediate indexing, that is, intermediate indexing not only on the upper edges of the main separators, but also the same indexing on the tabs of the appropriate intermediate dividers. This not only causes the loss of time required for providing such double indexing, but also provides a major source for error and confusion.

Certain attempts have been made to eliminate the foregoing problems and one such form of visible record file has included main separators having a transparent strip secured to and extending completely across the upper edges of the main separators. In this form of construction, absolutely no indexing is provided on the main separators but there is provided only the intermediate indexing on the appropriate tabs of the intermediate dividers.

Thus, the file clerk in the use of this construction for locating main indexing is required to view the intermediate indexing on the tabs of the intermediate dividers through the transparent strips on the main separators and in this manner locate not only main indexing, but also intermediate indexing. Again considerable confusion and time consuming delays have resulted.

Still a further problem which has been apparent in both of the foregoing prior visible record file constructions, as well as other constructions of similar type, is the difficulty in securing the necessary finger engagement members and indexing holders at the upper edges of the main separators. It is necessary to form these members and holders relatively thick and bulky as compared to the relatively thin sheet-like main panel portions of the main separators in order to provide convenient recessed or angled surfaces for finger engagement, to provide main indexing holders thereon, and also to provide natural spacing between the main separators for the positioning of the intermediate dividers and the record cards between these dividers.

Further, in the case of the latter prior construction discussed above wherein a continuous transparent strip is provided at the upper edge of the main separators, although the thickness cannot be greatly increased if clear vision is to be provided therethrough and, therefore, the stiffness of the main separator is not particularly increased, these transparent strips must still be separately fastened if such transparency is to be provided. Thus, there is the problem of fastening the relatively thin transparent strips to the relatively thin main separator panels.

The most usual method of fastening these finger engagement members and indexing holders to the upper edges of the main separators has been by securing rivets through an overlap at the line of joining. This necessarily results in rivet heads protruding from the main separator panels spaced downwardly from the upper edges thereof and, therefore, in the general location of the intermediate guides and sometimes even the record cards, thereby not only presenting protrusions which can be accidentally engaged by record cards and destroy the same, but also adding thickness to the main separator panels at the exact locations where such thickness is not desired.

Still a further disadvantage of this riveted construction is that the forming of rivet holes and the final forming of the rivets for proper securing of the members together necessarily weaken these members in the areas of the rivets. Since the finger engagement members are used for physically pivoting the main separators in order to gain access to the intermediate dividers and record cards therebetween, this riveted fastening area must take up the bulk of the strain from such finger engagement and pivoting, resulting in problems of failure around and in the areas of these rivets.

It is, therefore, a general object of the present invention to provide a file construction which overcomes the above discussed difficulties and disadvantages of the prior visible record file constructions and also provides other distinct advantages thereover.

It is a primary object of the present invention to provide a file construction of the foregoing type in which main indexing may be provided on the main separators and intermediate indexing only on the intermediate dividers with the intermediate indexing being clearly visible through the main separators despite the main indexing on these main separators.

It is a further object of the present invention to provide a file construction of the foregoing type in which relatively thick and bulky end cap members are secured to the upper edges of the main separators extending inwardly from the side edges thereof and a transparent strip is secured to the main separators at the upper edges thereof between these end caps, to thereby provide not only the increased stiffness for the main separators, the desired natural spacing between main separators, the desired finger engaging portions, and the desired locations for main indexing on these main separators, but also the "see-through" advantages of the generally central relatively thin transparent strip without the disadvantage of lack of increased stiffness.

It is still a further object of the present invention to provide a file construction of the foregoing type and having the relatively thick and bulky end cap members in combination with the generally central transparent strip in which the necessary separate fastening of these members and strips to the panels of the main separators does not require rivets and eliminates the many disadvantages thereof discussed above.

It is another object of the present invention to provide a file construction of the foregoing type having the above relatively complex construction, yet in which the various parts thereof are formed in a unique manner so as to provide for relatively simple and expeditious manufacture and assembly.

It is an additional object of the present invention to provide a file construction of the foregoing type in which the main panels of the main separators may be formed of metal, the relatively thick and bulky end cap members and generally central transparent strip may be formed of plastic, yet the various parts are uniquely mated so as to provide finished main separators of greatly increased strength and durability.

Finally, it is an object of the present invention to provide a file construction of the foregoing type which satisfies all of the above objects in a simple and efficient manner and at a minimum of expense.

These and other objects are accomplished by the parts, constructions, arrangements, combinations and subcombinations comprising the present invention, a preferred embodiment of which—illustrative of the best mode in which applicant has contemplated applying the principles—is set forth in the following description and illustrated in the accompanying drawings, and which is particularly and distinctly pointed out and set forth in the appended claims forming a part hereof.

In general terms, the file construction of the visible record type comprising the present invention includes upstanding transversely extending main separators, with a series of upstanding transversely extending intermediate dividers mounted behind the main separators. Furthermore, these main separators and intermediate dividers may be mounted in the usual visible file frame forwardly and rearwardly pivotal in the usual manner.

More particularly, each main separator is provided with thickened transversely elongated end cap members secured to the upper edge of the main separator adjacent each of the side edges thereof and extending substantial distances transversely inwardly along this upper edge. Furthermore, the main separator is formed with a strip-like transparent generally central cap member secured to the upper edge of the main divider extending above this upper edge and transversely between and secured to the end cap members.

The main part of each of the main separators may be formed of an upstanding transversely extending relatively thin panel of metal, and the end cap members and central cap member may be formed of plastic. The mounting or fastening therebetween may be accomplished by forming generally upwardly extending tabs on the main separator received in downwardly opening slots of the end cap members, and the upper edge of the main separator between the end cap members received in a downwardly opening transversely extending slot in the central cap member, with the major portion of this central cap member extending thereabove.

Furthermore, it is preferred to form the main separator tabs and end cap member slots angling rearwardly relative to the plane of extension of the remainder of the main separator panel, and the main separator upper edge between the end cap members as well as the central cap member slot and preferably the front and back surfaces of the central cap member angled rearwardly, preferably in general transverse alignment with the rearward angling of the tabs and end cap member slots. Still further, the end cap members may be formed with thickened knob-like portions at least at the transverse extremities thereof, with rearwardly angled surface portions extending transversely intermediate the knob-like portions and being rearwardly angled substantially transversely parallel to the central cap member rearwardly angled surfaces. Finally, the ends of the central cap member are preferably transversely telescoped within the end cap member slots, with all cap members being secured to the main separator and preferably to each other by gluing, so as to completely eliminate the necessity of riveting.

The intermediate dividers more particularly are preferably formed with intermediate indexing tabs secured to the upper edges thereof and extending above these upper edges in upward alignment with the main divider central cap member. Also, all of these intermediate divider tabs are rearwardly aligned transversely between the main separator end cap members and visible through the transparent central cap member, with this main separator central cap member being free of marking which would obstruct the view therethrough of said intermediate divider tabs.

Thus, with this construction of main separators and intermediate dividers, main indexing may be mounted on at least one of the end cap members of each of the main separators and intermediate indexing may be mounted on the intermediate divider tabs, with this intermediate indexing being clearly visible through the central cap members of the main separators.

Figure 11:
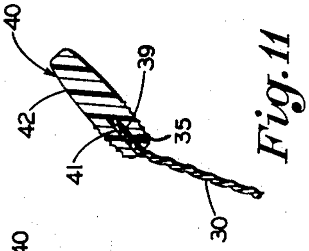
Figure 10:
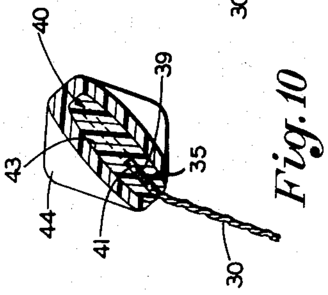
Figure 9:
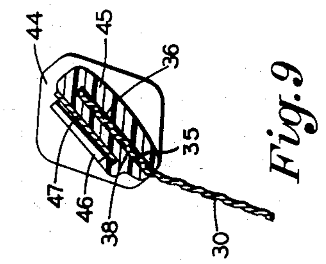
Figure 8:
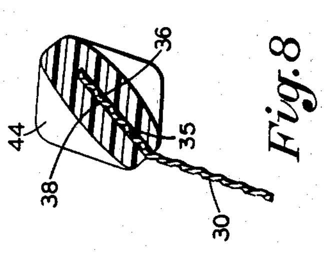
Figure 7:
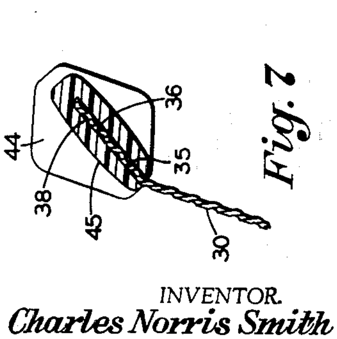
Figure 3:
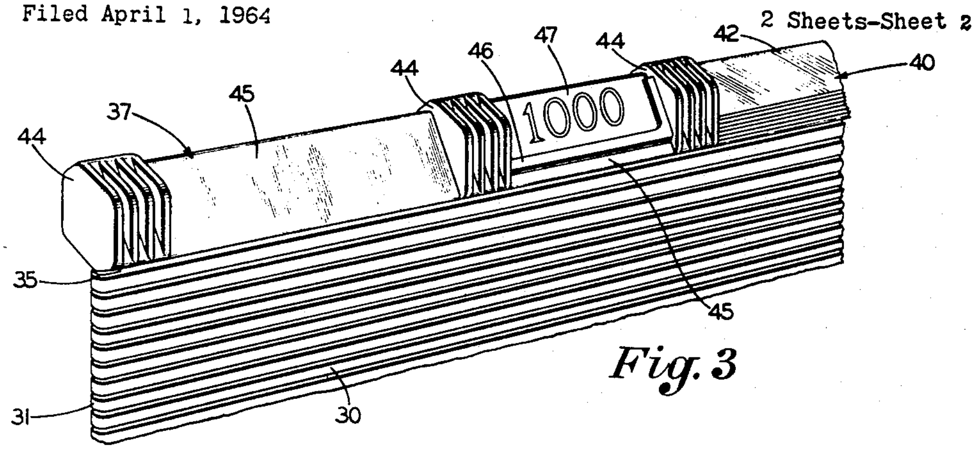
Figure 5:
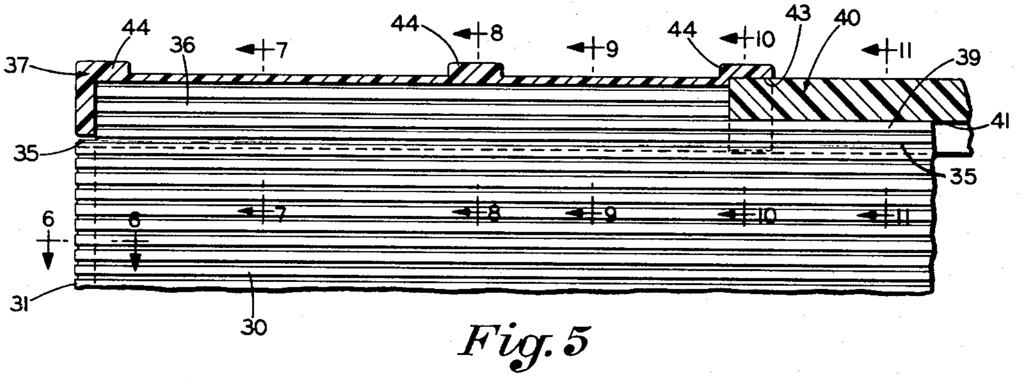
Figures 2, 4, 6:
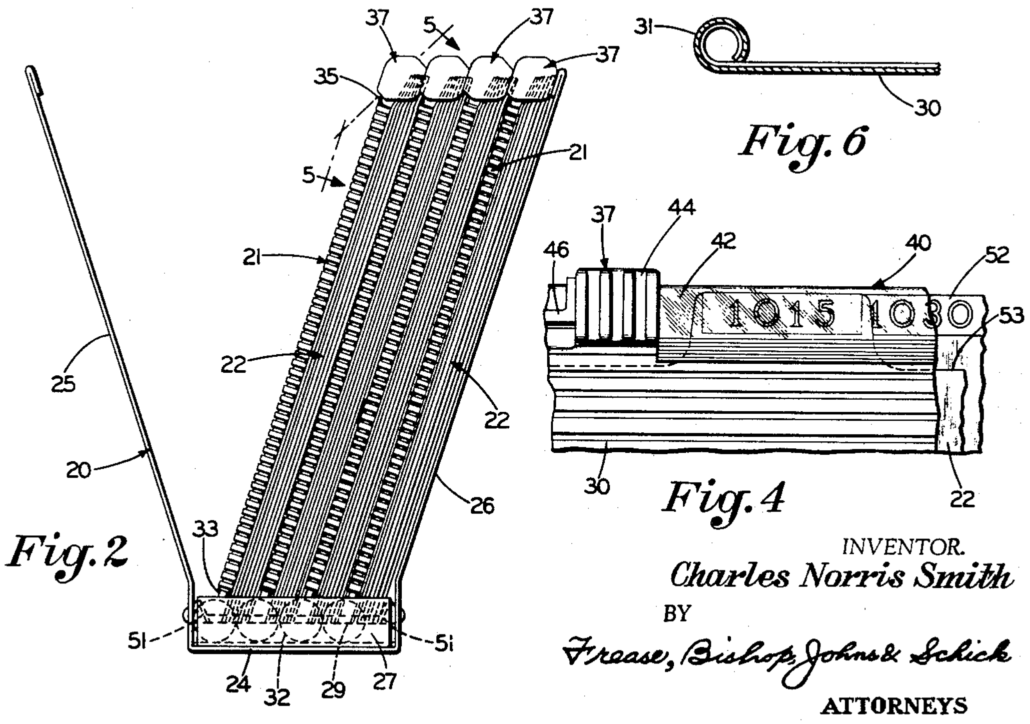

By way of example, an embodiment of the visible record file construction of the present invention is illustrated in the accompanying drawings forming a part hereof, wherein like numerals indicate similar parts throughout the several views and in which:

FIG. 1 is a fragmentary vertical sectional view, with parts broken away, of a file construction incorporating the improvements of the present invention;

FIG. 2, an end elevation of the file construction of FIG. 1;

FIG. 3, an enlarged fragmentary front perspective view of the upper left-hand corner portion of the forwardmost main separator shown in FIG. 1;

FIG. 4, an enlarged fragmentary front elevation, with parts broken away, showing an upper edge portion of the main separator and intermediate dividers taken from FIG. 1;

FIG. 5, an enlarged fragmentary sectional view, part in elevation, looking in the direction of the arrows 5—5 in FIG. 2;

FIG. 6, an enlarged fragmentary sectional view, part in elevation, looking in the direction of the arrows 6—6 in FIG. 5;

FIG. 7, an enlarged fragmentary sectional view, part in elevation, looking in the direction of the arrows 7—7 in FIG. 5;

FIG. 8, an enlarged fragmentary sectional view, part in elevation, looking in the direction of the arrows 8—8 in FIG. 5;

FIG. 9, an enlarged fragmentary sectional view, part in elevation, looking in the direction of the arrows 9—9 in FIG. 5;

FIG. 10, an enlarged fragmentary sectional view, part in elevation, looking in the direction of the arrows 10—10 in FIG. 5; and FIG. 11, an enlarged fragmentary sectional view, part in elevation, looking in the direction of the arrows 11—11 in FIG. 5.

Referring to the drawings, the particular embodiment of visible record file construction illustrated includes a file frame, generally indicated at 20, a series of main separators, generally indicated at 21, various series of intermediate dividers, generally indicated at 22, and various series of record cards, generally indicated at 23. For purposes of describing the present invention, all of the main separators 21 with the exception of particular indexing thereon, all of the intermediate dividers 22 with the exception of the particular transverse positioning of the indexing tabs and indexing thereon, and all of the record cards 23 with the exception of the particular transverse positioning thereof and the particular indexing thereon, are all in their respective series or groups of series substantially identical, so that a detailed description of one of each of the main separators, intermediate dividers, and record cards will suffice for a clear understanding of the remainder.

Referring to FIGS. 1 and 2, the file frame 20 may be formed of sheet metal and includes the bottom wall 24, the front and back partially angled walls 25 and 26, and the short end walls 27 having the inward angled engagement flanges 28. Furthermore, a raised horizontally extending shelf 29 is mounted in the file frame 20 extending forwardly and rearwardly between the front and back walls 25 and 26, spaced above the bottom wall 24 and having the ends thereof spaced inwardly from the short end walls 27.

Each of the main separators 21 includes a substantially flat main panel 30 which may be formed of horizontally ribbed sheet aluminum, preferably curled or rolled at the ends thereof to provide vertical stiffness as indicated at 31 and shown in section in FIG. 6. Preferably metal ball members 32 are mounted at the lower corners of the main panel 30 with the vertically upwardly extending mounting stems 33 received telescoped upwardly into the main panel rolled edges 31, being secured therein in any usual manner such as by crimping the rolled edges 31.

The main separators 21 are positioned in the file frame 20 with the ball members 32 received downwardly transversely between the frame end walls 27 and frame shelf 29, engaged beneath the underlying engagement flanges 28 of the frame end walls 27, as best seen in FIG. 1. Thus, the main separators 21 are forwardly and rearwardly pivotally mounted in generally upstanding position in the file frame 20, pivotal on the ball members 32 and with the lower edge 34 of the main panel 30 spaced above the horizontal shelf 29 of file frame 20.

Furthermore, these main separators 21 may be disengaged and removed from the file frame 20 merely by transversely flexing the separator main panel 30, to thereby move either of the ball members 32 transversely inwardly from vertical engagement with either of the engagement flanges 28 of the frame end walls 27. Also, it is preferred, when the main separators 21 are pivotally mounted in the file frame 20, that the size relationship between the separator ball members 32 and the frame shelf 29 is such that the centers of the ball members 32 will be substantially horizontally aligned with the horizontal plane of the frame shelf 29, resulting in the pivoting radii of the main separators 21 actually originating in the horizontal plane of the frame shelf 29, as will be hereinafter discussed more in detail.

As shown in FIG. 5, the upper edge portion 35 of the separator main panel 30 is formed adjacent each of the rolled edges 31 with the integral upstanding end cap fastening tabs 36 which extend transversely inwardly from either side of the main panel 30 and terminate appreciable transverse distances inwardly. Furthermore, as best seen in the sectional views of FIGS. 7 through 11, these fastening tabs 36 as well as a central part of the panel upper edge portion 35 transversely between these tabs, are all formed angled rearwardly along a common horizontal line, with the vertical extent of the panel upper edge portion 35 transversely between tabs 36 being appreciably less than the vertical extent of the tabs so as to give a vertically stepped upper edge effect across this panel upper edge portion.

The end cap members 37, preferably formed of an opaque plastic, are formed with the rearwardly angled, generally vertically and transversely extending slots 38, which slots open generally downwardly and terminate internally spaced downwardly from the upper extremities of the end cap members 37. These end cap members 37 are positioned telescoped over the panel fastening tabs 36 at either side of the main panel 30 and extend from vertical alignment with the panel rolled edges 31 transversely inwardly an appreciable extent and spaced inwardly from the inner ends of tabs 36, so that tabs 36 terminate transversely inwardly short of the end cap members 37 and these tabs are received upwardly into the end cap member slots 38.

It will be noted that, in view of the fact that the fastening tabs 36 terminate inwardly of the inner ends of the end cap members 37, the remaining inner extent of the end cap members receive the shorter or lower rearwardly angled portion 39 of the panel upper edge portion 35 within the slots 38. Also, it will be noted that it is preferred to continue the horizontal ribbing of the main panel 30 upwardly along these fastening tabs 36 as well as along the rearwardly angled portion 39 of the panel upper edge portion 35 for a purpose to be hereinafter further discussed.

The generally strip-like transparent and generally central cap member 40 is formed with a vertical, downwardly and transversely opening slot 41, with this slot 41 terminating upwardly within the central cap member 40 so as to have generally vertical height at least equal or slightly greater than the generally vertical extent of the rearwardly angled portion 39 at the panel upper edge portion 35. Further, the central cap member 40 is telescoped over the rearwardly angled portion 39 of the panel upper edge portion 35 so as to receive this rearwardly angled portion upwardly into the slot 41, as best seen in FIG. 11, and with the central cap member extending the entire transverse distance between the inner ends of the end cap members 37.

The general vertical dimensions of the central cap member 40 are such that a major part of this cap member extends above the rearwardly angled portion 39 of the panel upper edge portion 35 so that the major upper part of the central cap member provides a clear transparent "see-through" portion 42. Also, the front and rear surfaces of the central cap member 40 are preferably formed so as to angle rearwardly in planes generally parallel with rearward angling of the portion 39 of the panel upper edge portion 35 as well as the fastening tabs 36.

The transverse extremities or ends of the central cap member 40 are secured to the inner ends of the end cap members 37 preferably by being received a short transverse distance into enlarged portions 43 of the end cap member slots 38 so that not only is the central cap member 40 telescoped over the panel upper edge portion 35, but is likewise telescoped by the end cap members 37, and in this manner, the central cap member, which in files of this form will normally be of many times the transverse length of the end cap members 37, will be maintained relatively rigid throughout the transverse extent thereof by this unique fastening relationship. In addition, the end cap members 37 and central cap member 40 are glued to the panel fastening tabs 36 and rearwardly angled portion 39 of the panel upper edge portion 35, as well as being glued to each other at the telescoped portions thereof, by use of a usual glue intended for fastening plastic to metal commonly obtainable upon commercial market, and this glued fastening is not only greatly strengthened by the telescoped relationship of the various parts, but is additionally strengthened by the fact that the horizontal ribbing of the main panel 30 is continued upwardly into the panel fastening tabs 36 and rearwardly angled portion 39 of the panel upper edge portion 35, as previously described.

Thus the glued fastening and telescoped relationship between the main panel 30, end cap members 37 and central cap member 40, as well as greatly added strength provided by the rearward angling of the panel fastening tabs 36 and panel rearwardly angled portion 39, form an extremely strong construction with a long durable life. Furthermore, in view of the fact that the entire fastening is accomplished by the combined telescoping and gluing, the objectionable rivet fastening prevalent in prior constructions, which can cause failures and accidental destruction of cards as well as objectionable thickness for the main separators 21, is completely eliminated.

As clearly shown in the drawings, each of the end cap members 37 is provided with an appreciable forward and rearward thickness by the three transversely spaced knob-like portions 44 separated by the transversely extending reduced thickness and rearwardly angled portions 45. Furthermore, as best shown in FIGS. 1, 3, 4 and 9, an upwardly opening card holder 46 may be formed on the innermost of the reduced thickness portions 45 of the left-hand end cap member 37, as viewed in FIGS. 1, 3 and 4, for reception of the main indexing card 47. The rearward angling of the reduced thickness portions 45, both as to the forward and rearward surfaces thereof, is preferably parallel with the surfaces of the central cap member 40 and, therefore, also the panel fastening tabs 36 and the rearwardly angled portion 39 of the panel upper edge portion 35

The forward and rearward thicknesses of the knob-like portions 44 on the end cap members 37 is preferably the same as the thickness of the ball members 32 at the lower corners of the main parallel 30, so that the combination of these knob-like portions and ball members form uniform spacing between the various main separators 21. Furthermore, these knob-like portions 44 add strength and rigidity to the end cap members 37 and aid in supporting the central cap member 40, and the reduced thickness portions 45 not only provide a convenient location for the card holder 46 as described, but also provide convenient finger engagement locations for pivoting the main separators during use.

The intermediate dividers 22 are formed in generally usual manner preferably of stiff pasteboard or paper having lower edges 48 resting on a relatively soft cloth mat 49 positioned over the shelf 29 of the file frame 20. Further, these intermediate dividers 22 terminate transversely short of the transverse extremities of the main separators 21, and the lower edges 48 are notched out in any manner desired so as to completely clear but be maintained forwardly and rearwardly aligned and against appreciable transverse movement by the usual positioning bars 50, as shown in FIG. 1.

Positioning bars 50, as is usual in file constructions of this type, are spaced apart transversely, extend forwardly and rearwardly, and are parallel to the file frame shelf 29 lying flat-wise over the mat 49 on this shelf. These positioning bars 50 are retained at the forward and rearward ends thereof by reception in openings of the inverted V-shaped holders 51, which holders are fastened to and extend transversely along the inner surfaces of the file frame front and back walls 25 and 26, as best seen in FIG. 2.

Most important to the principles of the present invention is the positioning of the upstanding indexing tabs 52 which are formed extending above the upper surfaces 53 of the intermediate dividers 22, as shown in FIGS. 1 and 4. It will be noted that the upper surfaces 53 of the intermediate dividers 22 are spaced slightly below the central cap members 40 of the main separators 21, with the indexing tabs 52 extending upwardly therefrom into general horizontal alignment with the transparent or "see-through" portion 42 of the central cap members 40.

Also, in a particular series of intermediate dividers 22 behind any individual main separator 21, it is preferred to provide the indexing tabs 52 transversely staggered from one divider to the next, as shown, so that the major portion of each indexing tab is generally horizontally visible through the particular central cap member 40 of the main separator 21. Still further and equally important, all of the indexing tabs 52 of the intermediate dividers 22 are vertically aligned transversely between the main separator end cap members 37 so as to be all exposed through the central cap member 40.

Thus, the indexing tabs of the intermediate dividers 22 may be provided with usual intermediate indexing indicated, for instance, at 54 corresponding to the main indexing 47 of the main separator 21 behind which these intermediate dividers are directly positioned. Furthermore, all of the intermediate indexing 54 relating to the main indexing 47 will be visible through the central cap member 40 of that particular main separator 21.

Between the various intermediate dividers are positioned series of record cards 23. These record cards 23 are of relatively small transverse length and are preferably staggered from left to right, as viewed in FIG. 1, in order rearwardly.

Still further, the record card lower edges 55 are notched in usual manner for clearing, but yet being maintained properly transversely aligned, by the positioning bars 50 of the file frame 20 previously described, and the upper edges 56 of these cards are spaced slightly below the upper edges 53 of the intermediate dividers 22 so as to be below the indexing tabs 52. Finally, the record cards 23 behind any particular intermediate divider 22 may be formed with indexing shown, for instance, at 57 in FIG. 1, which indexing relates to the particular intermediate divider.

Thus, in use of the visible record file construction of the present invention and referring to FIG. 1, assume that a file clerk is desirous of obtaining the file card 1020, it is merely necessary for the file clerk to consult the main indexing 47 on the main separators 21 to find the main indexing category 1000, and then, by viewing through the particular central cap member 40, locate the intermediate indexing 54 which would be the next lower from this record card 1020, in this case being the intermediate indexing 1015. The file clerk would then engage the fingers of one hand over the main separator central cap member 40 to engage the appropriate intermediate divider indexing tab 52 carrying the intermediate indexing 1015 and pivot that intermediate divider 22, along with all intermediate dividers and main separators 21 forwardly thereof, to expose the particular series of record cards 23 including the record card bearing the indexing 1020.

As previously described, the centers of the ball members 32 on the main separators 21 are generally horizontally aligned with the horizontal plane of the file frame shelf 29, and also as previously described, all of the intermediate dividers and record cards 23 rest downwardly on the file frame shelf 29. For this reason, all of the main separators, intermediate dividers and record cards when pivoted forwardly or rearwardly, will pivot about substantially the same horizontal plane, thereby creating a minimum of movement therebetween during this pivoting which could otherwise disrupt the proper order thereof.

Thus, according to the principles of the present invention, a visible record file construction is provided which combines all of the advantages, yet eliminates all of the disadvantages of the prior constructions; eliminates a relatively large portion of the tedious and time consuming previously required indexing; is formed of a unique combination providing maximum strength and durability; provides the maximum of convenience and efficiency in use; and yet may be provided at a minimum of expense.

In the foregoing description, certain terms have been used for brevity, clearness and understanding but no unnecessary limitations are to be implied therefrom, because such words are used for descriptive purposes herein and are intended to be broadly construed.

Moreover, the embodiment of the improved construction illustrated and described herein is by way of example and the scope of the present invention is not limited to the exact details of construction shown.

Having now described the invention, the construction, operation and use of a preferred embodiment thereof, and the advantageous new and useful results obtained thereby, the new and useful construction and reasonable mechanical equivalents thereof obvious to those skilled in the art are set forth in the appended claims.

I claim:

1. File construction including an upstanding transversely extending main separator having upper and side edges, a series of upstanding transversely extending intermediate dividers mounted behind the main separator and having upper edges, thickened transversely elongated end cap members secured to the main separator upper edge adjacent each of the side edges thereof and extending substantial distances transversely inwardly along said upper edge, the transverse elongation of the end cap members resulting in said end cap members having transverse dimensions many times greater than any other dimensions of said end cap members, the major portion of the main separator extending downwardly beneath and free of the end cap members, a transparent generally central cap member secured to the main separator upper edge extending above said upper edge and transversely between and secured to the end cap members, upstanding indexing tabs secured to the intermediate divider upper edges and extending above said upper edges in upward alignment with the main divider central cap member, all of the intermediate divider tabs being rearwardly aligned transversely between the main separator end cap members and visible through the transparent central cap member, and the main separator central cap member being free of marking which would obstruct the view therethrough of said intermediate divider tabs; whereby, main indexing may be mounted on at least one of the main separator end cap members and related intermediate indexing may be mounted on the intermediate divider tabs with said intermediate indexing clearly visible through the main separator central cap member.

2. File construction as defined in claim 1 in which the main separator end cap members are mounted telescoped down over the main separator upper edge; in which the main separator central cap member is mounted telescoped down over the main separator upper edge; and in which the main separator end cap members are telescoped transversely over the ends of the main separator central cap member; in which the end cap members are formed with thickened knob-like portions at least at the transverse extremities thereof; and in which the end cap members have recessed surface portions extending transversely intermediate the knob-like portions.

3. File construction including an upstanding transversely extending main separator having upper and side edges, generally upwardly extending tabs formed integrally on the main separator upper edge adjacent each of the main separator side edges and extending transversely inwardly along the main separator upper edge, thickened transversely elongated end cap members having generally downwardly opening transversely extending slots formed therein, the end cap members being mounted over the main separator tabs adjacent each of the main separator side edges receiving said tabs in said slots and the end cap members extending substantial distances transversely inwardly along the main separator upper edge, the main separator tabs terminating transversely inwardly at least at inner ends of the end cap members, the end cap member slots and main separator tabs being rearwardly angled relative to the major transverse extent of the remainder of the main separator, a transparent generally central cap member mounted over the main divider upper edge extending above the main divider upper edge and transversely between the end cap members, the central cap member having a generally downwardly opening and transversely extending slot formed therein, the central cap member being mounted over the main divider upper edge with said main divider upper edge received upwardly into said central cap member slot, the central cap member slot and forward surface of the central cap member and the part of the main separator upper edge received in said central cap member slot all being angled rearwardly relative to the major transverse extent of the remainder of the main separator, and ends of the central cap member being secured transversely to the end cap members.

4. File construction including an upstanding transversely extending main separator having upper and side edges, thickened transversely elongated end cap members having generally downwardly opening transversely extending slots formed therein, the end cap members being mounted over the main separator upper edge adjacent each of the main separator side edges and extending substantial distances transversely inwardly along the main separator upper edge, generally upwardly extending tabs formed integrally on the main separator upper edge aligned with and received upwardly in the end cap member slots, the main separator tabs terminating transversely inwardly at least at inner ends of the end cap members, a transparent generally central cap member mounted over the main divider upper edge extending above said main divider upper edge and transversely between the end cap members, the central cap member having a generally downwardly opening and transversely extending slot formed therein, the central cap member being mounted over the main divider upper edge with said main divider upper edge extending upwardly into said central cap member slot, and the ends of the central cap member being received transversely into the end cap member slots.

5. File construction as defined in claim 4 in which the end cap member slots and main separator tabs are rearwardly angled relative to the major transverse extent of the remainder of the main separator; and in which the central cap member slot and forward and rearward surfaces of the central cap member and the part the main separator upper edge received in said central cap member slot are all angled rearwardly generally transversely aligned with said end cap member slots and main saparator tabs.

6. File construction as defined in claim 4 in which the end cap member slots and main separator tabs are rearwardly angled relative to the major transverse extent of the remainder of the main separator; in which the central cap member slot and forward and rearward surfaces of the central cap member and the part the main separator upper edge received in said central cap member slot are all angled rearwardly generally transversely aligned with said end cap member slots and main separator tabs; in which the end cap members are formed with thickened knob-like portions at least at the transverse extremities thereof; and in which the end cap members have rearwardly angled recessed surface portions extending transversely intermediate the knob-like portions which are rearwardly angled substantially transversely parallel to the central cap member rearwardly angled surfaces.

7. File construction as defined in claim 4 in which the end cap member slots and main separator tabs are rearwardly angled relative to the major transverse extent of the remainder of the main separator; in which the central cap member slot and forward and rearward surfaces of the central cap member and the part the main separator upper edge received in said central cap member slot are all angled rearwardly generally transversely aligned with said end cap member slots and main separator tabs; in which the end cap members are formed with thickened knob-like portions at least at the transverse extremities thereof; in which the end cap members have rearwardly angled recessed surface portions extending transversely intermediate the knob-like portions which are rearwardly angled substantially transversely parallel to the central cap member rearwardly angled surfaces; in which the main separator is formed of sheet metal and the end and central cap members are formed of plastic; in which the main separator upper edge is secured extending upwardly into the end and central cap member slots and the end and central cap members are secured together by gluing; and in which the reception of the main separator upper edge into the end and central cap member slots and gluing between said main separator and end and central cap members is the sole means securing said cap members to said main separator.

References Cited by the Examiner

UNITED STATES PATENTS

| | | | |
|---|---|---|---|
| 2,318,489 | 5/1943 | Iuculano | 129—16 |
| 2,457,855 | 1/1949 | Weston | 129—16 |
| 2,584,174 | 2/1952 | Weston | 129—16 |

FOREIGN PATENTS

| | | |
|---|---|---|
| 800,747 | 12/1950 | Germany. |

JEROME SCHNALL, *Primary Examiner.*